Dec. 19, 1967      C. A. CHRISTIANSON      3,358,519
RATCHET DRIVE
Filed Oct. 23, 1965
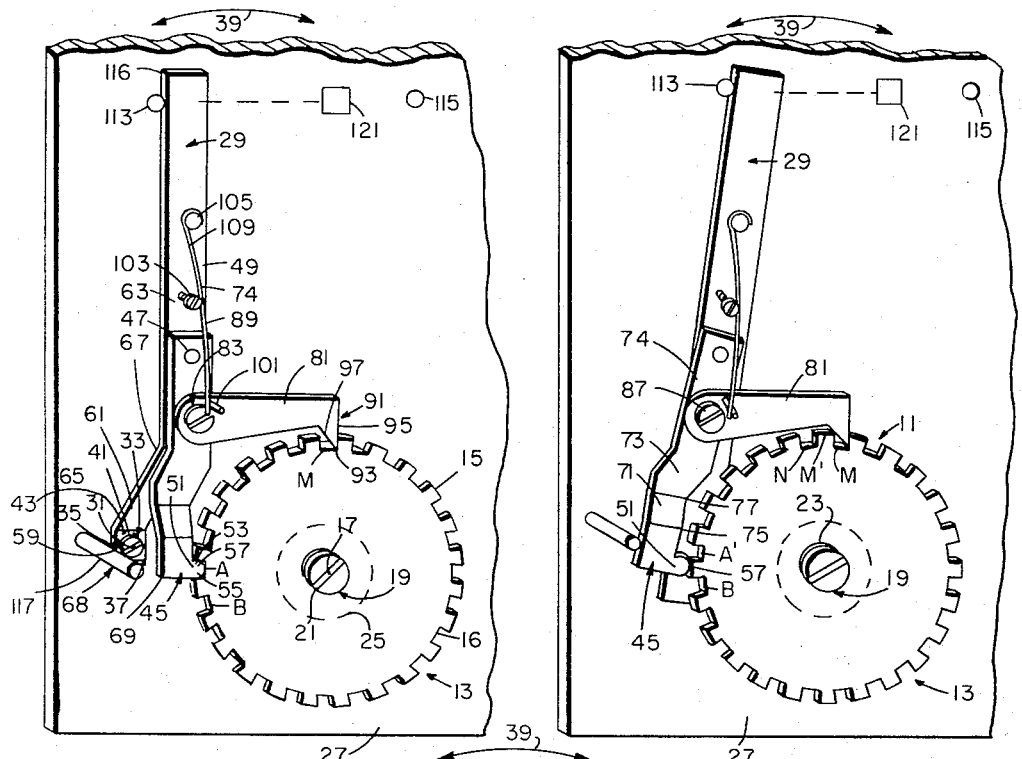
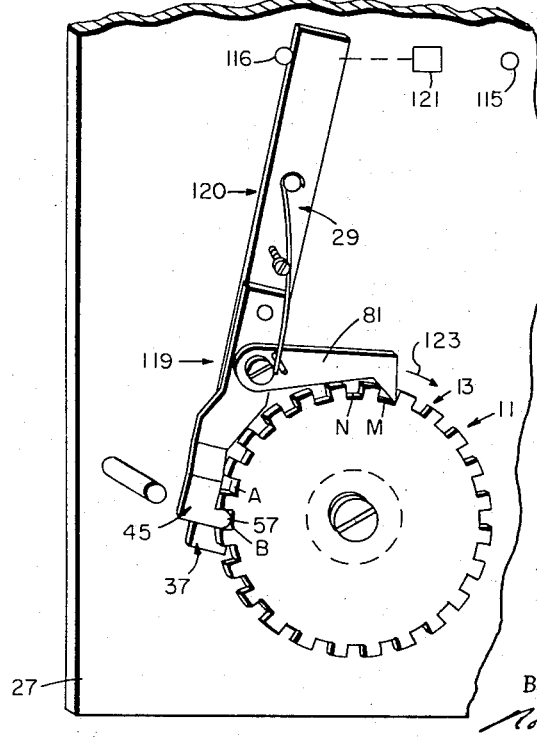
INVENTOR.
BY CARL A. CHRISTIANSON

United States Patent Office 3,358,519
Patented Dec. 19, 1967

3,358,519
RATCHET DRIVE
Carl A. Christianson, Southold, N.Y., assignor to the United States of America as represented by the United States Atomic Energy Commission
Filed Oct. 23, 1965, Ser. No. 504,275
5 Claims. (Cl. 74—142)

ABSTRACT OF THE DISCLOSURE

Ratchet wheel drive that maintains rounded locking stub means and pointed advancing pawl means always in contact with the outside edge of a toothed ratchet wheel to prevent overriding beyond rotation of the wheel one tooth at a time only, the stub means sequentially moving along from the bottom of one tooth wall across the top of one tooth and into an adjacent tooth well while the pawl means remains at the bottom of another tooth well as the pawl means rotatively advances the wheel one tooth width only in one direction, and the pawl means moving only out of the bottom of one tooth well across the top of one tooth and into an adjacent tooth well while the stub means remains at the bottom of another tooth well where it locks the wheel against rotation in either direction.

---

This invention relates to control drives and more particularly to control drive systems for automatic target transfer machines in high energy accelerators. This invention was made in the course of, or under, a contract with the U.S. Atomic Energy Commission.

In high energy physics a need exists for a quick acting, precise, foolproof and remote acting control drives for the automatic target transfer machines used in inserting targets into flipping machines, which relatively rotate targets into accelerator beams. These targets must move quickly and precisely at frequent intervals due to the repetitive, transient and speed of light nature of the beam and the confined space available to the targeting apparatus. Foolproof remote operations is also required due to the expense of the accelerator operation, the time required for setting up and running the targeting experiments and the high radiation levels induced by the beam in the target.

Electric and magnet devices for controlling the target and drive movement do not operate properly at such precise, confined conditions or at such beam speeds or repetition rates. Others, such as those that depend on springs, gears and pawls either move without positive locking against inadvertent movement or are too cumbersome, bulky, expensive, or undependable for routine work.

It is an object of this invention, therefore, to provide an economical and practical apparatus for controlling target transfer mechanisms by providing a ratchet wheel drive that moves one tooth at a time and in which the motion of the wheel is independent of the torque on the wheel from sources other than the drive;

It is another object to provide a means for locking a ratchet wheel drive against adventitious external torque on the wheel that can cause the wheel to move inadvertently;

It is a further object to provide a system for sequentially locking and unlocking a ratchet wheel from rotatable movement;

It is a further object to provide a positive drive mechanism for a ratchet wheel having provision for locking and unlocking the rotation of the ratchet wheel;

It is a further object to provide apparatus and method for moving an accelerator target that will cause the least interference with the accelerator apparatus and operation;

It is a further object to provide a simple and compact accelerator target driving means;

It is a still further object to provide a quick-acting precise, foolproof and remotely operating drive for targeting systems for high energy charged particle accelerators.

By this invention, there is provided method and apparatus for rotating a ratchet wheel drive for relatively rotating a series of cams, which in turn control the control transfer mechanism for inserting the proper target into the flipping machine, which in turn relatively rotates the target against a high energy charged particle beam in the multiple bev. range, such as in the Brookhaven Alternating Gradient Synchrotron. The method and construction involved in this invention utilizes standard and well known techniques and apparatus and is highly flexible for a wide range of applications, ratchet speeds, repetition frequencies, and accelerator apparatus. More particularly, this invention involves the use of a ratchet wheel having circumferential gear teeth, a pawl for advancing the wheel one tooth at a time, a locking arm pivoted with the pawl, means for urging the pawl and locking arm into engagement with the teeth of the wheel, and means for sequentially unlocking the locking arm and then advancing the pawl to move the wheel one tooth at a time. With the proper selection of components, sequencing and interaction, as described in more detail hereinafter, the desired control drive is achieved.

The above and further objects and novel features of this invention will appear more fully from the following detailed description when the same is read in connection with the accompanying drawings. It is to be expressly understood, however, that the drawings are not intended as a definition of the invention, but are for the purpose of illustration only.

In the drawings where like parts are numbered alike:

FIGURE 1 is a partial side view of the apparatus of this invention in an initial position at a first point in time;

FIGURE 2 is a partial side view of the apparatus of FIGURE 1 in a second position at a second later point in time in a typical cycle of operation;

FIGURE 3 is a partial side view of the apparatus of FIGURE 1 in a third position at a third later point in time in the same typical cycle of operation.

Referring now to FIGS. 1, 2 and 3, the drive of this invention, comprises a round ratchet wheel 11 having a circumferential array 13 of radiating teeth 15 thereon. Advantageously teeth 15 are uniformly spaced generally square teeth having equal pitch lengths that are formed by cutting voids 16 having dimensions that are equal to the teeth dimensions. These teeth 15 are advantageously produced by suitably milling a rigid disc having two flat, circular, opposite sides and a common intersecting cylindrical outside at right angles thereto forming the circular outside diameter of the wheel. One suitable material for wheel 11 is Micarda brand insulating fiber since it has a high resistance to frictional wear and a low level of induced radiation even adjacent a target in a high energy proton beam. However, any high strength, and induced radiation resistant material may be used. Suitable materials comprise Formica brand phenolic resin, stainless steel or aluminum.

Wheel 11 rotates around an axis 17 provided by screw 19, which has an enlarged head 21 that holds a washer 23 between the head 21 and wheel 11 and a washer (not shown) between the wheel 11 and a raised cylindrical plug 25 attached to base 27. The wheel 11 is parallel to base 27 and the top of plug 25 of base 27. Plug 25 advantageously has a radius less than the circumference of wheel 11 and in the embodiment shown in FIG. 1, the radius of plug 25 is less than half the radius of wheel 11.

Anchor arm 29 pivots around fixed axis 31 provided by pin 33, which is securely mounted in base 27 and fitted in hole 35 formed by arm 29 at its end 37 for relative rotation of arm 29 through an arc, illustrated by double headed arrow 39. To this end, the pin 33 has an enlarged head 41 that holds a first washer 43 between head 41 and arm 29 for easy relative rotation between pin 33 and arm 29. Also, pin 33 holds a second washer (not shown) between arm 29 and base 27 for easy relative rotation between arm 29 and base 27. Advantageously the arm axis 31 is parallel to the wheel axis 17 on a line intersecting the circumference of wheel 11. Arm axis 31, may, however, be separated from wheel axis 17 a distance from equal to half the radius of wheel 11 to 3/2 the radius of wheel 11.

Arm 29 also carries a locking link or stop link arm 45 that rotates around pin 47, which is embedded inside a hole (not shown) in side 49 of anchor arm 29. This locking link 45 has a stub end 51 that fits into the voids or depressions 16 and has a width and pitch equal to the width and depth of these voids 16 between the teeth 15. The corners 53 and 55 of stub 51 are rounded with equal radii that curve from the center 57 of the stub to flat sides of width equal to the pitch diameter of the adjacent teeth and the width of voids 16 between two teeth 15. Thus the stub 51 moves by itself easily out of the voids 16 upon the lifting of the stub out of a depression 16 and the subsequent rotation of wheel 11.

Advantageously, arm 29 has first, second and third straight sections 59, 61 and 63 formed with first and second bends 65 and 67. First straight section 59 of arm 29 is parallel to third straight section 63 of arm 29 and portion 68 of base 27 and the second section 61 thereof connects these first and second sections at bends 65 and 67. Locking link 45 advantageously has first, second, third and fourth straight sections 69, 71, 72 and 73 formed with first and second bends 75 and 77. The first, third and fourth sections 69, 72, and 73 of link 45 are parallel with the first and second sections 59 and 63 of arm 29 and the second section 71 of link 45 connects the other two sections thereof at bends 75 and 77. Second sections 61 and 71 of arm 29 and link 45 are disposed at an angle to each other so that first section 69 and its stub 51 of link 45 are parallel with the sides of wheel 11. Also, the third section 72 of link 45 forms an elbow 78 in the plane of fourth section 73 of link 45 whereby the third and fourth sections of link 45 are in the same plane and the first section 69 of link 45 is in the plane of teeth 15 of wheel 11.

Locking link 45 also has a pawl 81 mounted thereon in the plane of the teeth 15 of wheel 11. To this end link 45 carries a pin 83 having a small diameter portion that fits in a hole (not shown) in pawl 81 and extends to an enlarged portion 87 that holds pawl 81 against side 89 of link 45. Pawl 81 has a triangular shaped head 91 forming a V shape with a point 93 that fits into voids 16 between teeth 15, a flat end 95 that mates with one side of each tooth 15 one tooth at a time, and a slanted side 97 that contacts the opposite adjacent tooth 15 whereby the pawl 81 moves in one direction with flat end 95 against one tooth 15 to move wheel 11 in that direction and the pawl moves in the opposite direction to raise the pawl 81 out of void 16 between two adjacent teeth 15 forming the void 16 in which the pawl point 93 was located.

The link 45 and pawl 81 provide a spring arrangement tending to hold the link 45 and pawl 81 against the outside circumference of wheel 11 and to push the stub 51 and pawl point 93 toward each other and into different spaced voids 16 between teeth 15 at the same time or when appropriate as described in more detail hereinafter. To this end pawl 81 carries a pin 101 and arm 29 carries screws 103 and 105 which are arranged whereby screw 103 holds one end 107 of spring 109 so that one side of spring 109 pushes against one side of screw 105 and the opposite side of spring 109 pushes against one side of pin 101. Thus the spring 109 resists the rotation of pawl 81 around pin 101 away from wheel 11 and spring 109 resists the rotation of link 45 around pin 47 in arm 29.

Advantageously suitable stops 113 and 115 are provided on base 27 for end 116 of arm 29 against the rotation of arm 29 in the arc 39 beyond the limits set by stops 113 and 115 and peg 117 stops the rotation of link 45 away from wheel 11 beyond the limit set by peg 117.

In operation, a cycle will be described in which stub 51 and pawl point 93 are in spaced voids A and M between spaced pairs of teeth 15, stub 51 moves in one direction from void A to adjacent void B, and pawl point 93 moves first in the opposite direction (at a later point in time from void M to adjacent void N) while arm 29 moves in arc 39 to advance the wheel 11 one tooth at a time and to move the stub 51 and pawl 81 from their first mentioned void to their next adjacent voids. At the beginning of this cycle shown in FIG. 1, arm 29 is against stop 113, stub 51 is in void A and pawl point 93 is in void M. At this point there are six open depressions between stub 51 and pawl point 93. In this position stub 51 prevents wheel 11 from moving in either direction and to this end locking link 45 and pawl 81 are disposed along tangent lines to the circumference of wheel 11 and at right angles to each other. Also, spring 109 tends to close locking link 45 and pawl 81 against wheel 11 and toward each other. Arm 29 rotates in arc 39 in a clockwise direction from stop 113 to stop 115 whereby stub 51 is raised by the interaction of arm 29, pawl 81 and wheel 11 to permit wheel 11 to turn clockwise. Then pawl point 93 rotates wheel 11 one tooth in a clockwise direction while pawl point 93 remains in void M and stub 51 moves up over tooth A (FIG. 2) and into void B thus locking link and pawl 81 with seven depressions 16 between them. Then arm 29 rotates in arc 39 in a counterclockwise direction to stop 113 while wheel 11 is stationary whereby pawl point 93 moves in a counterclockwise direction relative to wheel 11, out of void M across tooth M' and into void N, while stub 51 remains in void B as shown in FIG. 3. The wheel 11 is then ready for the next cycle of operation like the one described and further cycles in endless repetition.

In this position of stub 51 shown in FIG. 3 the stub prevents wheel 11 from moving in either direction. It is also noted that even if wheel 11 is inadvertently moved during a cycle when stub 51 is on top of tooth A; as shown in FIG. 2, this movement will cause stub 51 to move into the adjacent void 16 thus to prevent movement of wheel 11 more than one half tooth. Moreover, if arm 29 is held when stub 51 is on top of tooth A' (or other teeth 15) pawl point 93 is engaged to prevent wheel 11 from moving at all in a counterclockwise direction. Also, during withdrawal of pawl point 93 from void 16, wheel 11 remains locked against movement in either direction by the engagement of the locking link 45 in a void 16 between wheel teeth 15. It is additionally noted that when stub 51 is in the bottom of a void 16, stub 51 prevents wheel 11 from moving in either direction no matter where arm 29 is. Also, arm 29 can move from stop 115 to stop 113 while stub 51 remains in a void 16. In this regard, spring forces 119 and 120 keep stub 51 and pawl point 93 engaged with wheel 11.

Advantageously, a suitable biasing means 121 moves arm 29 back and forth between stops 113 and 115 to provide force 123 to move wheel 11 in a clockwise direction one tooth at a time. To this end a suitable electromagnetic solenoid 121 can be energized with current flow in one direction to move arm 29 in one direction e.g. clockwise and the solenoid can be energized with current flow in the opposite direction to move arm 29 in the opposite direction, i.e. counterclockwise. Means 121, however, may also be another link or a sliding member.

This invention has the advantage of providing a simple, precise and fast acting remotely operated ratchet movement for accelerator target transfer mechanisms, the ratchet being locked in both directions in all phases of its operational cycle except during the actual advance of movement of the ratchet. Also, the system of this invention engages the lock, in the next proper position, should the ratchet attempt to advance faster than the pawl during the advance portion of the operational cycle, position. In actual practice, if the ratchet attempts to move faster than the pawl during the "advance," this in effect removes the operating force and allows the top spring to force the stop-link against the ratchet ready to engage the next depression.

What is claimed is:

1. A ratchet wheel drive comprising a ratchet wheel having circumferential teeth forming depressions therebetween, locking link means tangent to the circumference of said wheel and having pivoted thereon around a first axis a stub means insertable in the depressions between said teeth, pawl means tangent to the circumference of said wheel and separately pivoted on said stub means around a second axis having a pointed end insertable in said depressions between said teeth, single spring means mounted between said locking link means and said pawl means for maintaining both said stub means and said pawl means always in contact with the outside of said wheel forming said teeth, and actuating means for rotating said pawl means to advance said wheel a distance equal to one tooth width, said stub preventing the rotation of said wheel when said stub is inserted in the bottom of one of said depressions and said actuating means being operable to cause said pawl means to move said stub from said depressions whereby said actuating means can move said pawl means to rotate said wheel one tooth width while said rotation of said wheel advances said stub from one depression to the next adjacent depression in the direction opposite to the direction of rotation of said wheel.

2. A ratchet wheel drive that remains locked throughout its cycle except for that portion of the cycle when the wheel is being advanced, which comprises a ratchet wheel, a pawl for advancing the wheel one tooth at a time, an arm, means pivoted on said arm around a first axis and carrying said pawl pivoted thereon around a second axis for sequentially unlocking the wheel one tooth at a time, and single spring means having a longitudinally extending spring mounted under tension between said arm and said pawl for maintaining both said means pivoted on said arm and said pawl always in contact with the outside of said wheel forming said teeth whereby said means prevents said wheel from overriding in either direction.

3. A ratchet wheel drive that remains locked throughout its cycle except for that portion of the cycle when the wheel is being advanced, which comprises a ratchet wheel having circumferential teeth forming depressions therebetween around a first axis, arm means pivotable in an arc about a second axis parallel with said first axis and separated therefrom a distance at least half the radius of said wheel, extended locking link means pivotably mounted on said arm means at one end thereof and having a portion at the opposite end thereof forming a stub that is insertable in said depressions, said stub having a curved portion connecting two flat sides separated by a distance equal to the distance between said wheel teeth and against which first adjacent of said teeth are sequentially in contact to stop said wheel against rotation in either direction around said first axis, extended pawl means pivotably mounted on said locking link means between the ends thereof having a portion that is insertable in said depressions with one side against one side of a tooth forming said depressions, spring means always holding said stub and portion of said pawl against the teeth and depression forming outside of said wheel, and means for pivoting said arm means from a first position to push one side of said portion of said pawl against one side of one of said teeth thereby to pivot said link means against the force of said spring means to unlock said stub from one of said depressions, said means for pivoting said arm means thereby forcing said pawl to rotate said wheel one tooth width so that said stub climbs out of said one of said depressions across the top of one of said teeth and into the next adjacent depression to stop said wheel from further rotation, said means for pivoting said arm means for returning said arm means to said first position whereby said portion of said pawl is transferred from one depression to an adjacent depression in a direction opposite to said wheel rotation for further movement of said wheel one tooth at a time.

4. The method of sequentially locking a ratchet wheel having teeth against rotation around an axis, comprising the steps of always holding a stop against the wheel for pushing the stop into the depression between first of said teeth with a first force that locks said wheel to stop said wheel rotation in either direction around said axis, and pushing against said teeth with a second force that sequentially overrides said first force to cause said stop to be unlocked by moving said stop from one depression to another depression and said wheel to be rotated in one direction around said axis, said rotation of said wheel after said unlocking of said stop being operable temporarily to override said first force by said second force whereby said first force operates to push said stop into a second depression between said teeth adjacent said first depression whereby said wheel rotates only one tooth at a time and is relocked against rotation around said axis.

5. A ratchet wheel drive having an outside edge profile forming teeth and depressions therebetween, advancing pawl means, and stub means adapted to contact the outside edge profile of the wheel, comprising means continuously providing a force against both the stub means and the pawl means for forcing both the stub means and pawl means continuously into contact with said outside edge profile under pressure both when said wheel is stationary and when said wheel is rotated, and pawl means moving in one direction sequentially to move said stub up from the bottom of said depressions against said force and to advance the wheel only one tooth width in one direction only during which time said stub means follows said edge contour to move from the bottom of one depression to the bottom of an adjacent depression in the opposite direction to said wheel advance, said stub means otherwise preventing advance of said wheel in said one direction and said opposite direction when disposed at the bottom of one of said depressions, and said pawl means moving in the opposite direction to move from the bottom of one depression to the bottom of an adjacent depression while said stub means prevents said wheel advance to provide for the next advance of said wheel in said one direction one tooth width only and to provide for said corresponding movement of said stub means in the opposite direction during the time of said wheel advance by said pawl means in said one direction only.

References Cited

UNITED STATES PATENTS

| 938,478 | 11/1909 | Greenfield | 74—142 X |
| 1,849,971 | 3/1932 | Baughan. | |
| 2,744,413 | 5/1956 | Schneider. | |
| 2,868,026 | 1/1959 | Finehout et al. | 74—142 X |
| 2,917,933 | 12/1959 | Harris. | |

FOREIGN PATENTS 576,293 France.

OTHER REFERENCES

Machine Design, Automatic Electric Company, Sept. 4, 1958, page 109, volume 30, No. 18.

FRED C. MATTERN, JR., *Primary Examiner.*

MILTON KAUFMAN, *Examiner.*

W. S. RATLIFF, *Assistant Examiner.*